(12) United States Patent
Guy et al.

(10) Patent No.: US 7,599,621 B2
(45) Date of Patent: Oct. 6, 2009

(54) TRAIL ENGINEERING IN AGILE PHOTONIC NETWORKS

(75) Inventors: John Peter Guy, Nepean (CA); Mukul Katiyar, Andhra Pradesh (IN); Robert Alain Nadon, Ottawa (CA); Rajender Rao Nednur, Temple Terrace, FL (US); Christian Scheerer, Weissach im Tal (DE); Jonathan Titchener, Dallas, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 576 days.

(21) Appl. No.: 10/952,325

(22) Filed: Sep. 28, 2004

(65) Prior Publication Data

US 2006/0002716 A1      Jan. 5, 2006

Related U.S. Application Data

(63) Continuation-in-part of application No. 10/128,092, filed on Apr. 23, 2002, which is a continuation-in-part of application No. 09/909,265, filed on Jul. 19, 2001, now Pat. No. 7,171,124.

(51) Int. Cl.
   *H04J 14/00*      (2006.01)
(52) U.S. Cl. ...................................................... 398/57
(58) Field of Classification Search .................. 398/48, 398/49, 57, 175
   See application file for complete search history.

(56) References Cited

U.S. PATENT DOCUMENTS

| | | | | |
|---|---|---|---|---|
| 6,633,712 | B2 * | 10/2003 | Dennis et al. | 385/123 |
| 6,671,442 | B2 * | 12/2003 | Wang et al. | 385/125 |
| 6,757,494 | B2 * | 6/2004 | Lu et al. | 398/25 |
| 6,889,007 | B1 * | 5/2005 | Wang et al. | 398/79 |
| 2002/0063915 | A1 | 5/2002 | Levandovsky et al. | |

FOREIGN PATENT DOCUMENTS

WO          01/18999 A1       3/2001

OTHER PUBLICATIONS

"Survivable Networks: Algorithms for Diverse Routing" by Ramesh Bhandari, Kluwer Academic, 1999, pp. 1-20.*
S. Kim et al., "Regenerator Placement Algorithms for Connection Establishment in All-Optical Networks", IEE Proc.-Commun., vol. 148, No. 1, Feb. 2001.*
K. Lee et al., "Multi-Wavelength All-Optical Networks with Wavelength Outside the Erbium-Doped Fiber Amplifier Bandwidth", Journal of Lightwave Technology, vol. 13, No. 5, May 1995.*

(Continued)

*Primary Examiner*—Shi K Li

(57) ABSTRACT

An agile transparent network with a trail routing and switching (also called "engineering") mechanism is provided that enables efficient use of regenerators and wavelengths available in the network, while maintaining a very efficient time-to-service. The trail engineering mechanism allows fast, automatic establishment of new connections based on the current network architecture, connectivity and loading and also on conditions in the connection request. Selection of regenerator sites and of the wavelengths used on each regenerator segment is performed with optimal use of current network resources, while ensuring that the quality of the selected trail is adequate for the respective call. The mechanism provides for both distance and performance balancing, and it optimizes the network response time.

18 Claims, 11 Drawing Sheets

OTHER PUBLICATIONS

G. Lehr et al, "Management o All-Optical WDM Networks: First Results of European Research Project Moon", NOMS '98. IEEE Network Operations and Management Symposium, vol. 3 Conf. 10, Feb. 15, 1998, pp. 870-879, XP000793435.

Nada Golmie et al, "A Differentiated Optical Services Model for WDM Networks", IEEE Communications Magazine, vol. 38, No. 2, Feb. 2000, pp. 68-73, XP000912316.

Nasir Ghani et al, "On IP-over-WDM Integration", IEEE Communications Magazine, vol. 38, No. 3, Mar. 2000, pp. 72-84, XP011091247.

Wolfgang Mader et al, "Results of the Photon and Moon Field Trials", OFC/IOOC '99. Optical Fiber Communication Conference/International Conference on Integrated Optics and Optical Fiber Communication, Feb. 21, 1999, pp. 234-236, XP000967039.

Banerjee et al, "A practical approach for routing and wavelength assignment in large wavelength-routed optical networks", IEEE Journal of Selected Areas in Communications 14 (5), Jun. 1996.

Jukan et al, "Service-specific resource allocation in WDM networks with quality constraints", IEEE Journal of Selected Areas in Communications 18 (10), Oct. 2000.

Ramaswami et al, "Design of logical topologies for wavelength-routed optical networks", IEEE Journal of Selected Areas in Communications 14 (5), Jun. 1996.

Zhang et al, "A heuristic wavelength assignment algorithm for multihop WDM networks with wavelength routing and wavelength re-use", IEEE/ACM Transactions on Networking 3 (3), Jun. 1995.

Mokhtar et al, "Adaptive techniques for routing and wavelength assignment in all-optical WANs", IEEE, 1997.

\* cited by examiner

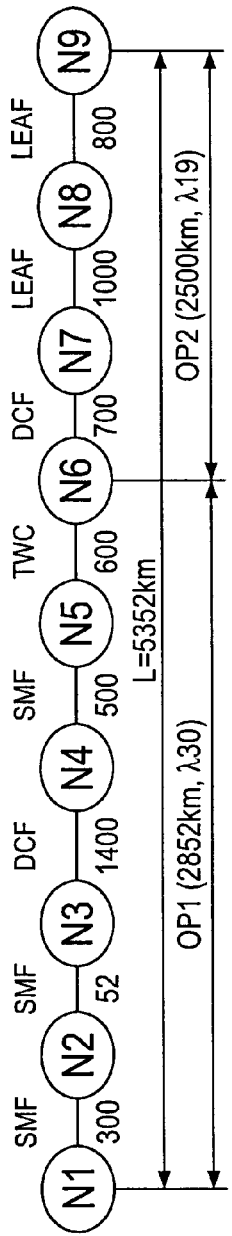
*FIG. 4A*
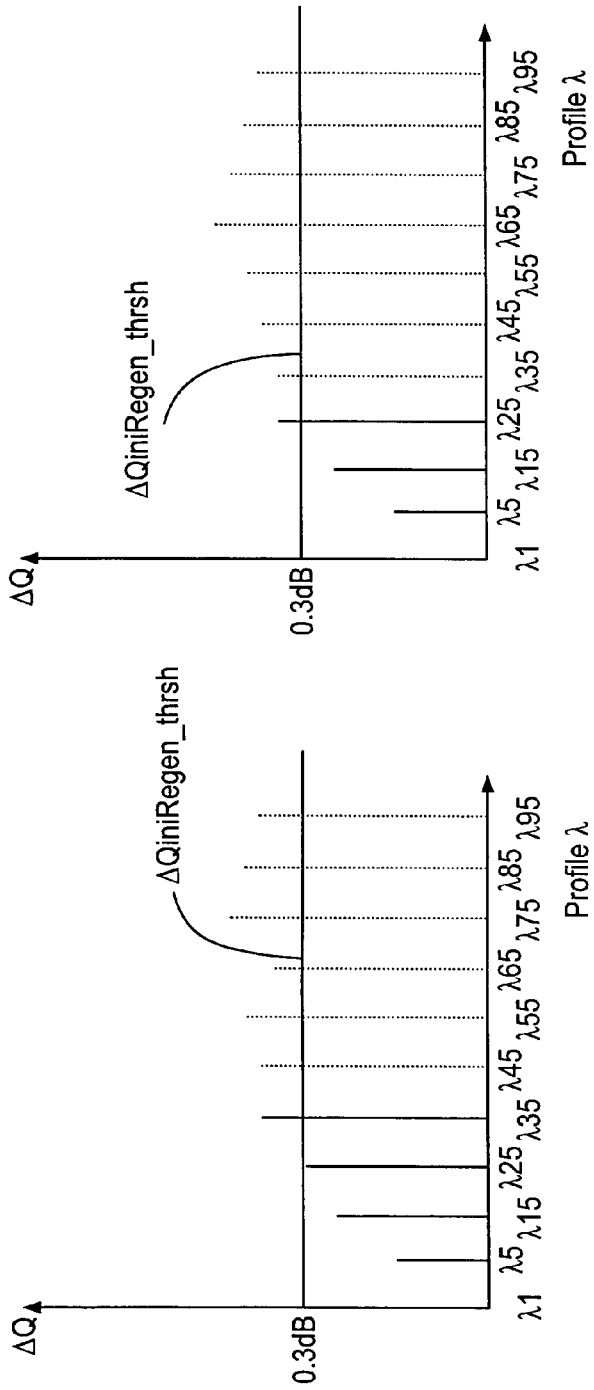
*FIG. 4B*
*FIG. 4C*

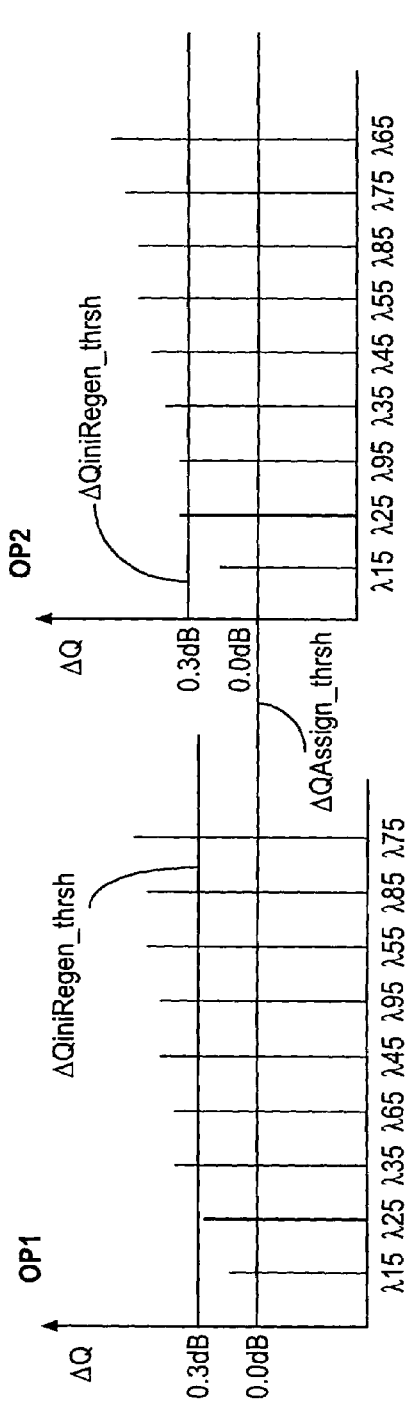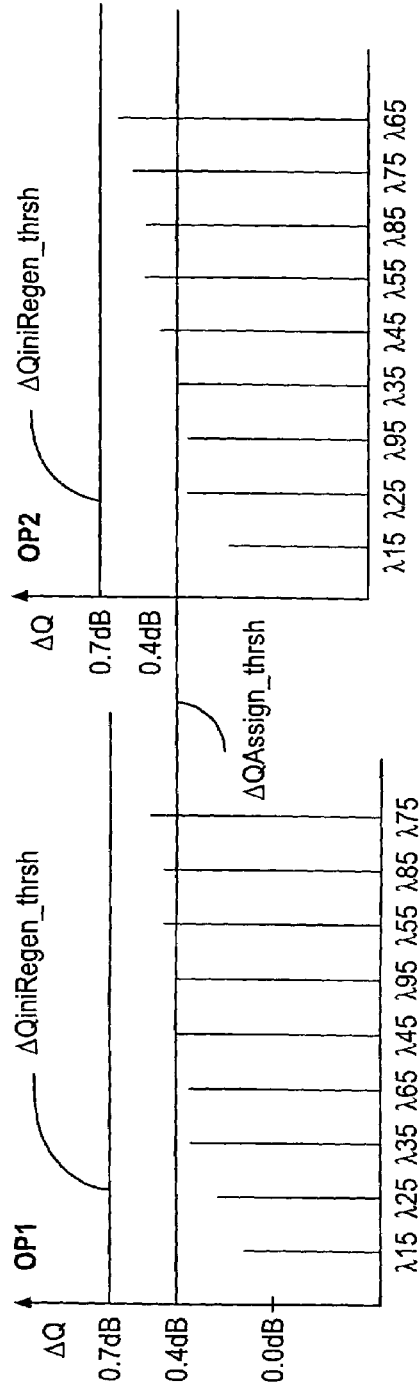

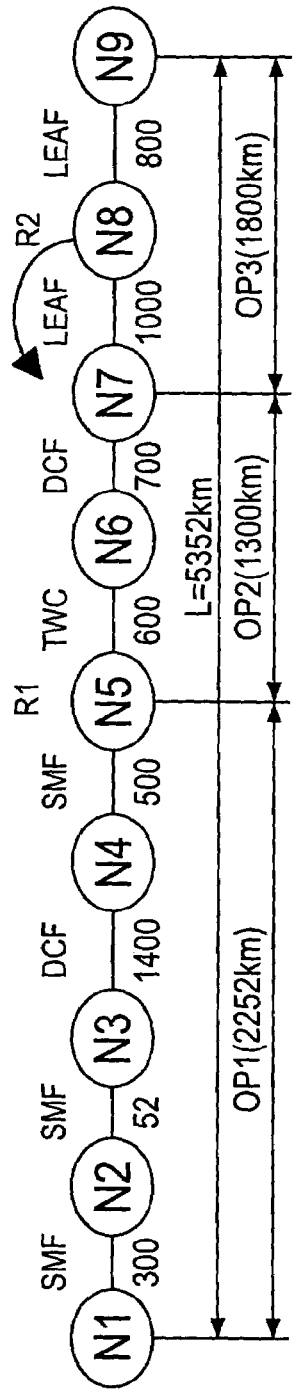
*FIG. 5A*
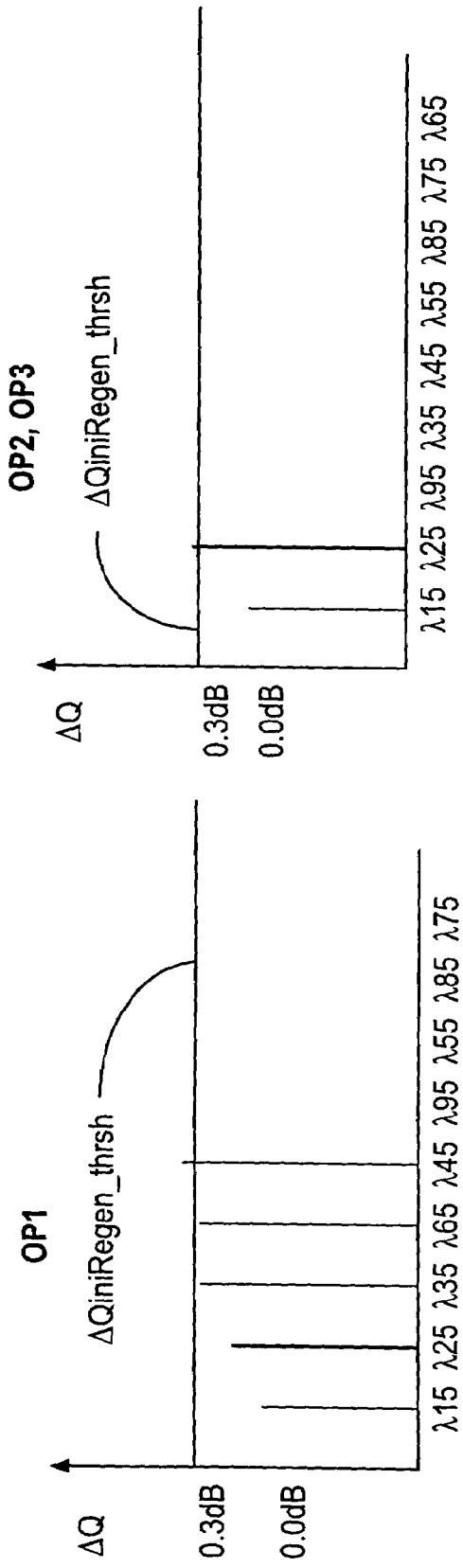
*FIG. 5B*
*FIG. 5C*

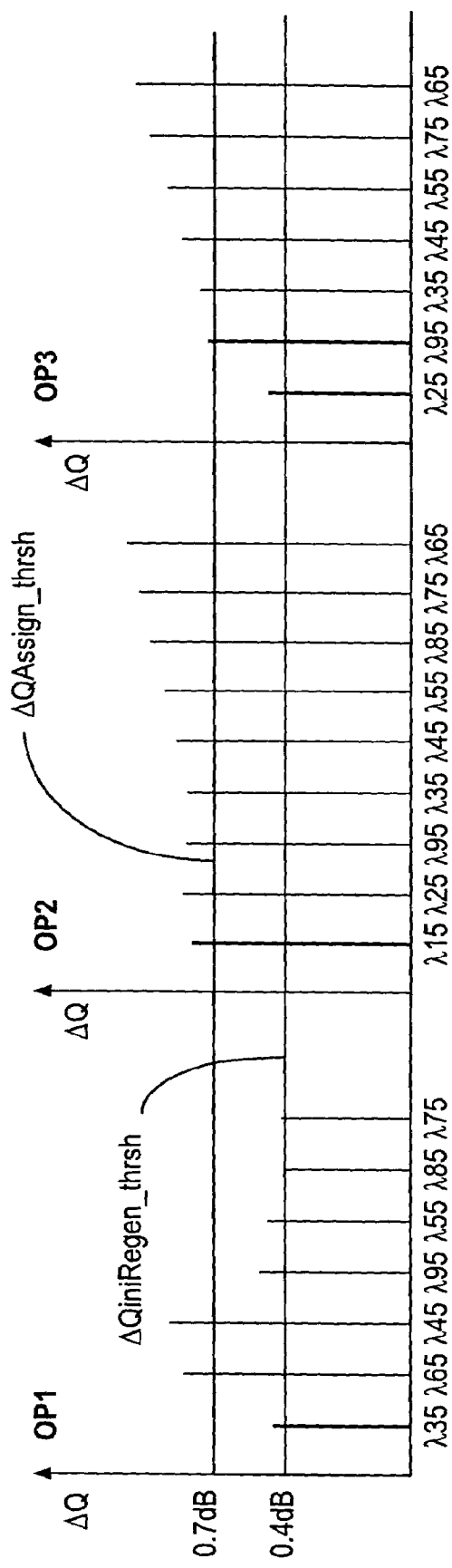

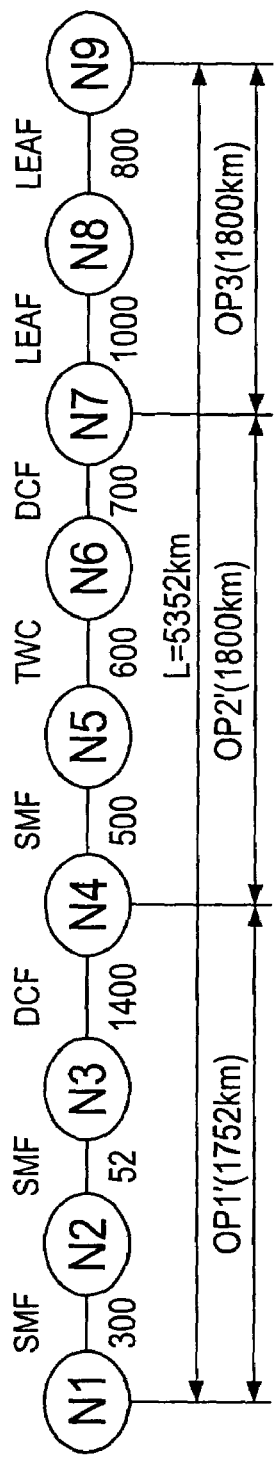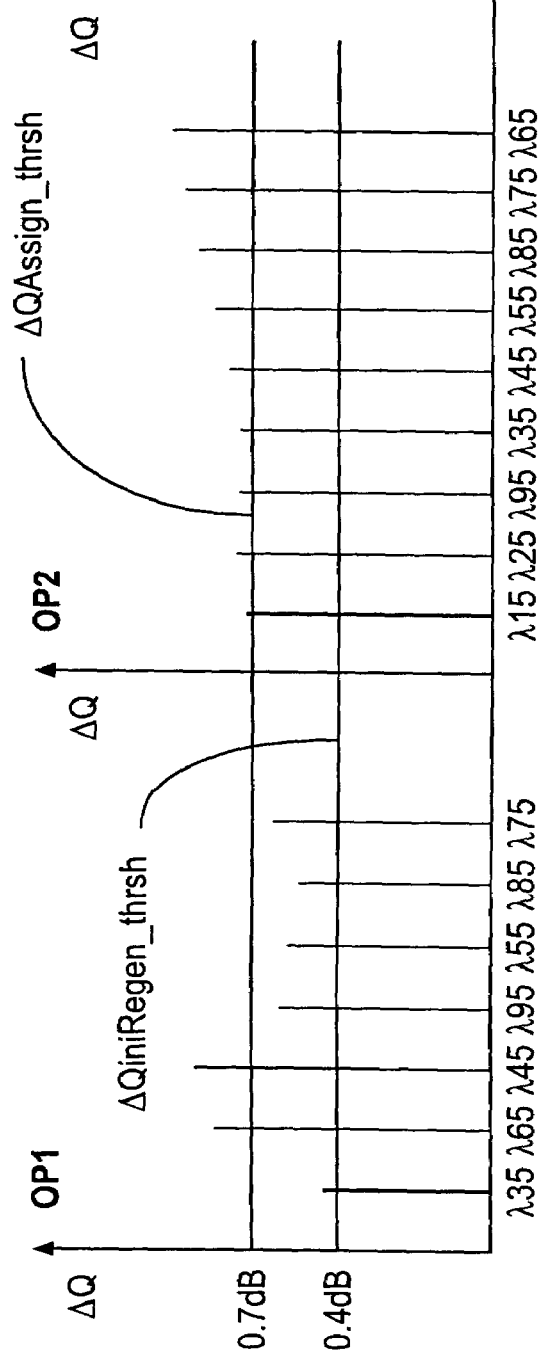
FIG. 6A
FIG. 6B
FIG. 6C

TRAIL ENGINEERING IN AGILE PHOTONIC NETWORKS

CROSS-REFERENCE TO RELATED APPLICATIONS

This patent application is a continuation-in-part of co-pending U.S. patent application Ser. No. 10/128,092, entitled "Dynamic Assignment of Wavelengths in Agile Photonic Networks" and filed Apr. 23, 2002, which is a continuation-in-part of U.S. patent application Ser. No. 09/909,265, entitled "Wavelength Routing and Switching Mechanism for a Photonic Transport Network" and filed Jul. 19, 2001 now U.S. Pat. No. 7,171,124.

This patent application is also related to co-pending U.S. patent application Ser. No. 10/097,901, entitled "Regenerator Placement Mechanism for Wavelength Switched Optical Networks" and filed Mar. 13, 2002 and also co-pending U.S. patent application Ser. No. 10/391,863, entitled "Channel Wavelength Assignment With Transient Reduction" and filed Mar. 19, 2003, both of which are incorporated herein by reference in their entirety.

TECHNICAL FIELD

The invention is directed to a telecommunication network and, in particular, to selecting a trail in an agile photonic network.

BACKGROUND OF THE INVENTION

Two of the more relevant trends in the optical networking area are the increase in network capacity and the increase in transmission reach. A higher network capacity is obtained by increasing the channel rate, e.g., with TDM (time division multiplexing), and/or by increasing the channel density, e.g., with WDM (wavelength division multiplexing).

Advances in transmitter and receiver design, evolution of optical amplification, employment of distributed Raman amplification combined with various dispersion compensation techniques, new encoding and modulation techniques, digital wrapper technology, etc., have enabled the installation of ultra-long reach networks, where regeneration of the signal is effected at 3,000 km or more.

However, current WDM networks use point-to-point connectivity, which means that all channels are OEO (optical-to-electrical-to-optical) converted at each node. In addition, the point-to-point network requires duplication of equipment for protection/restoration in case of faults. As a result, the configuration of a typical node of a point-to-point network is very complex. On the other hand, OEO conversion at all intermediate nodes is not necessary in the majority of cases, since the modern ultra-long reach (ULR) techniques allow optical signals to travel distances greater than the distance between two or more successive nodes without regeneration. Thus, important cost savings may be obtained by eliminating the unnecessary OEO conversion equipment.

There is a need to reduce the cost of the network nodes by maximizing the distance traveled by the signals in optical format, to take advantage of the emerging ULR techniques and to provide a more efficient use of the network equipment. Furthermore, scaling-up and/or providing new services in a point-to-point network requires very complex network engineering and planning involving extensive simulation and testing. Moreover, the waiting time for a new optical service in point-point networks can be over 120 days.

There is a need to break the wavelength engineering bottleneck currently constraining the engineering-to-provisioning ratio, and for wavelengths to become available as a network resource automatically deployable across the network. There is also a need to minimize the number of wavelengths that are deployed while avoiding the color clash effect for optical signals having different wavelengths and sharing a single fiber, for efficient use of all network resources.

Automatic switching and regeneration functionality results in regenerators and wavelengths becoming two of the most important resources of the photonic networks. In general, they could be allocated to a connection according to certain rules, which are mostly dictated by the class of service for the respective connection and by the particular architecture of the network. Methods to economically use these resources and minimize blocking of new connection requests are crucial to cost reduction and operational efficiency of photonic networks.

Determination of the number of regenerators and their nodal allocations is one aspect of efficient resource management in photonic networks. Regenerators need to be switched into an end-to-end connection so that the signal is regenerated and restored to superior quality before propagation and transmission impairments corrupt the signal entirely. Nodal allocation of regenerators is performed with a view to optimize the network cost, and depends mainly on maintaining a current view of the nodal configuration, including regenerator availability and type.

Further, in switched optical networks, the selection and assignment of the correct wavelength to each optical path for the best possible utilization of available wavelengths depends on several factors. These factors can include: (a) maintaining a current view of the current network connectivity; and (b) since "not all wavelengths are equal", providing the network with the knowledge of the individual wavelength performance. Knowing the current wavelength allocation allows the network to select one or more unused wavelengths to serve a new connection. This is even more important having in view that this allocation is dynamic, the connections being set-up and removed by users at arbitrary moments. Knowing the individual performance of all wavelengths available in the network and the pertinent topology information (e.g., fiber type, link loading, etc), allows matching a wavelength to an optical path, which allows further reduction of the network costs.

Nonetheless, selection and assignment of the correct wavelength for each optical path for the best possible utilization of available wavelengths is a complex problem. A meaningful solution to this complex problem is needed to facilitate the best possible use of wavelengths as a resource while satisfying connection setup demands.

SUMMARY OF THE INVENTION

According to the principles of the invention, an agile transparent network is provided with a trail routing and switching (also called "engineering") mechanism that enables efficient use of regenerators and wavelengths available in the network, while maintaining a very efficient time-to-service.

Advantageously, the trail engineering mechanism according to the invention allows fast, automatic establishment of new connections based on the current network architecture, connectivity and loading and also on conditions in the connection request. Selection of regenerator sites and of the wavelengths used on each regenerator segment is performed with optimal use of current network resources, while ensuring that the quality of the selected trail is adequate for the respective call. The mechanism provides for both distance and performance balancing, and it optimizes network response time.

BRIEF DESCRIPTION OF THE DRAWINGS

A more complete understanding of the principles of the invention may be obtained from consideration of the following detailed description in conjunction with the drawing, with like elements referenced with like references, in which:

FIGS. 4A-4G show an example of the method according to the invention, where FIG. 4A is an example of an A-Z trail illustrating initial regenerator placement and wavelength assignment to optical paths of the trail, FIGS. 4B and 4C show how the initial threshold is used for each optical path of the trail of FIG. 4A; FIGS. 4D and 4E show how the assignment threshold is used for each optical path of the trail of FIG. 4A, and FIGS. 4F and 4G show selection of further solutions using the threshold increments;

FIGS. 5A-5F shows by way of example another scenario of placing regenerators and assigning wavelengths to obtain further regenerator trails for trail N1-N9 of FIG. 4A by increasing the initial threshold and the assignment threshold;

FIG. 6A-6C shows by way of example still another scenario of placing regenerators and assigning wavelengths to obtain further regenerator trails for trail N1-N9 of FIG. 4A;

DETAILED DESCRIPTION

Figure 1A:
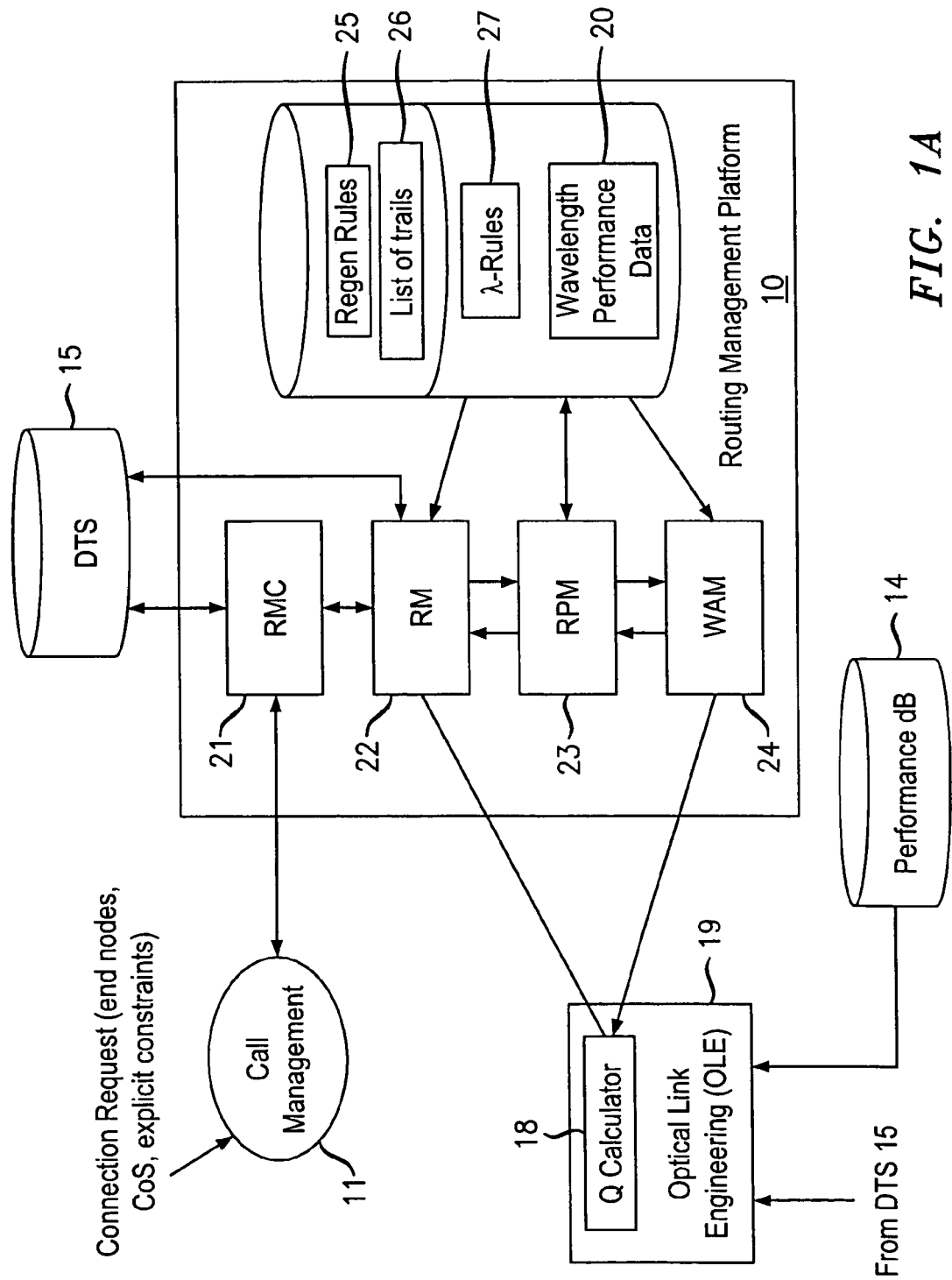
FIG. 1A shows the main modules involved in the routing and switching services of a photonic network, and their interaction.

To reduce the capital and operation costs associated with transport networks, the current network architecture must evolve from one that is static and point-to-point, to one that is dynamic and mesh connected. Such an agile transparent network (ATN), described in the above-identified U.S. patent application Ser. No. 09/909,265, attempts to maximize all-optical bypass for the pass-through traffic with a view to reduce the number of regenerators, and supports rapid turn-on of wavelengths where and when new connections are requested to minimize the need for expensive and forecast-dependent network provisioning operations. This functionality is enabled by use of new concepts, which in turn are enabled by the latest advances in optical technologies. ATN is realized using wavelength selective photonic switches, tunable light sources, a dynamic line system, and a distributed photonic (wavelength) control plane.

The following definitions are used throughout this specification.

A "connection request" refers to a request for exchanging traffic between two nodes. It includes conditions such as the source and destination nodes, traffic bandwidth and rate, the class of service CoS, the type of routing, explicit constraints, etc.

A "connection" is a logical route from a source node, generically referred to as node A to a destination node, generically referred to as node Z. A "route" or "trail" refers to a specific solution for the A-Z connection. Connections are generally bi-directional; term "forward" is used for the direction from node A to node Z, the term reverse is used for the direction from node Z to node A.

A "wavelength plan" refers to the set of wavelengths available network-wide. A wavelength plan specifies the telecommunication window on which the network operates (e.g. C-band, L-band), the wavelengths available in the respective window, and the wavelength spacing, etc. For example, the wavelength plan could provide ~100 wavelengths on a 50 GHz grid from 1567 nm to 1610 nm (i.e. L-band) which yields ~1 Tb/s per optical line amplifier. The term "loading" is a measure of the number of channels carried by a certain fiber/link. "Wavelength spacing" provides the distance between two consecutive wavelengths. Link loading and wavelength spacing are inter-related notions. The term "wavelength fragmentation" in connection with an optical path refers to the wavelength usage for all wavelengths used on all links along the respective optical path, and on links that end/originate at all nodes along that path.

A "regenerator site/node" is a node that OEO converts the traffic on the route passing through that node for wavelength conversion (relevant to this invention) or signal conditioning. The photonic network to which this invention applies (hereinafter referred as the "photonic network") has the ability to determine if a connection needs wavelength conversion (or/and traffic regeneration), looks for a regenerator available at one or more intermediate nodes along the A-Z trail and allocates regenerator(s) to the respective route to correctly deliver the signal to its destination. To this end, some or all nodes of the photonic network are provided with a pool of regenerators that are automatically switched into a connection as needed. Since the regenerators and the wavelength converters of the photonic network have a similar hardware design, they are collectively referred to in this specification as regenerators.

An "optical path" or "regenerator segment" refers to the fiber and the equipment between a transmitter and the next receiver, e.g. between two successive regenerators.

A "trail solution", "regenerator trail" or "regenerator route" refers to a trail where the regenerators have been placed and the wavelengths assigned to each optical path.

A "link" refers to the equipment (could be optical amplifiers, dispersion compensators, etc) and fiber between two successive photonic nodes. A link may include one or more fibers and the associate equipment.

"Network topology information" includes information on network equipment and connectivity, fiber type for each link, wavelengths availability per link, the number and type of transponders and regenerators at each node and their availability, etc. It is generically illustrated by data topology system DTS 15 in FIG. 1A.

To summarize, the ATN to which this invention applies, is equipped with a routing management platform (RMP) 10 of FIG. 1A shows generically the modules pertinent to the invention. A detailed description of one mode of operation of the routing and switching mechanism of FIG. 1A is provided in the above-identified U.S. patent application Ser. No. 09/909,265, the contents of which are incorporated by reference herein in their entirety.

More specifically, a call management (CM) block 11 provides RMP 10 with a connection request that specifies the source node A and the sink node Z, and certain conditions, and may include constraints associated with the class of services (CoS) of the call/user. Routing management platform 10 comprises a routing module (RM) 22, a regenerator placement module (RPM) 23 and a wavelength assignment module (WAM) 24. After receiving a call from block 11, a routing management controller (RMC) 21 operates modules RM 22, RPM 23 and WAM 24 to generate a list 26 of possible best trails between nodes A and Z. The RMC 21 analyzes and orders the trails according to their cost and/or chances of success, and returns them to call manager 11 one by one. Block 11 attempts to set-up the connection along one of these trails; if the first trail on the list fails to set-up, CM 11 requests the next trail from list 26 and so on, until a trail is successfully setup.

RPM 23 decides where to place regenerators along the A-Z trail based on regenerator and wavelength availability and rules 25, and has also the ability to change an initial placement of regenerators taking into account the distance-dependent nature of the wavelengths.

The WAM 24 assigns wavelengths to each optical path of the respective end-to-end A-Z trail, based on wavelength rules 27, wavelength availability from DTS 15, and on pre-stored information about wavelength performance, as shown at 20. This wavelength performance data (WPD) may be stored in the form of binning tables, described in detail by the U.S. patent application Ser. No. 10/128,092. In short, the wavelength assignment mechanism addresses wavelength contention in order to reduce wavelength blocking, considers wavelength-reach performance of the available channels, and assigns wavelengths with appropriate reach profiles for each optical path of the respective route.

Since the trail performance cannot be determined until after the WAM 24 assigns wavelengths to each optical path of the trail, RPM 23 may invoke WAM 24 multiple times for corroborating the decisions regarding the placement of regenerators with the optimal wavelength assignment, as these two modules 23, 24 perform inter-dependent functions.

A Q calculator 18 is available for use by the modules of the routing management platform 10. The Q calculator is a module provided by the optical link engineering (OLE) module 19, for calculating a quality factor Q based upon knowledge of the network topology from DTS 15 and optical devices specified and measured parameters generically shown by database 14. As calculator 18 uses computational complex routines, this could add a significant delay if used for every wavelength assignment for every optical path. To find a balance between using the wavelength binning tables only, with their inherent inaccuracies, or the Q calculator 18 only, with the delay incurred inherently by multiple executions of its routines, calculator 18 provides two variants of the path quality factor, namely aQquick and a Qcomplete, which are used as necessary.

During route selection, Q-calculator 18 estimates the quality for each optical path of the potential trail so that the routing management can select/reject the trails based on these values. When a wavelength is considered for an optical path, its estimated optical quality, or Q value for that particular path is used to determine the suitability and acceptability of the wavelength. If the estimated Qest value falls short of a required Qtest value, as determined by $\Delta Q = Qtest - Qest$, then the wavelength is not selected for that path. However, before rejecting the wavelength, both RPM 23 and WAM 24 collectively attempt some corrective measures for enhancing the end-to-end performance of the respective trail, to avoid searching for a new trail. RPM 23 finds a number of trails (e.g. four) and attempts to engineer each of them to the best of it's ability, which could mean attempting to find the wavelengths that have adequate Q margin ($\Delta Q$). If the initial solution doesn't work, RPM 23 moves the regenerator locations, and if that too doesn't work, it tries to add more regenerators. If none of the previously mentioned corrective steps provides a trail where all optical paths have sufficient margin, then the trail is abandoned, but the rest of the trails are attempted to be engineered. Finally, when all trails are engineered, the least cost one is selected to be setup and Q-complete is performed on it. If this test passes, the trail is sent to the call management 11 for set-up.

At the time the connection is set-up, Q calculator 18 determines a measured Q value Qmeas, (using Qcomplete routines) which reflects the optical path conditions in the network more realistically. If Qmeas<Qtest, RPM 23 and WAM 24 collectively attempt some corrective measures. Namely, all the trails (four) are again engineered using higher thresholds so that the new trail solutions will have higher Q margins ($\Delta Q$).

As indicated above, the characteristics of each optical path varies with fiber types, length, the number of optical add/drop multiplexing (OADM) nodes and wavelength switching node (WXC) and the characteristics of the optical components along the respective optical path (optical amplifier characteristics, dispersion characteristics, power loss, etc). Since not all the effects that influence an optical path may be accounted when preparing the WPD (wavelength performance data) 20, this information might not accurately portray the actual wavelength reach profile for the optical path. The Q calculator 18 does provide a much more accurate estimate of the reach for any given wavelength.

Figure 1B:
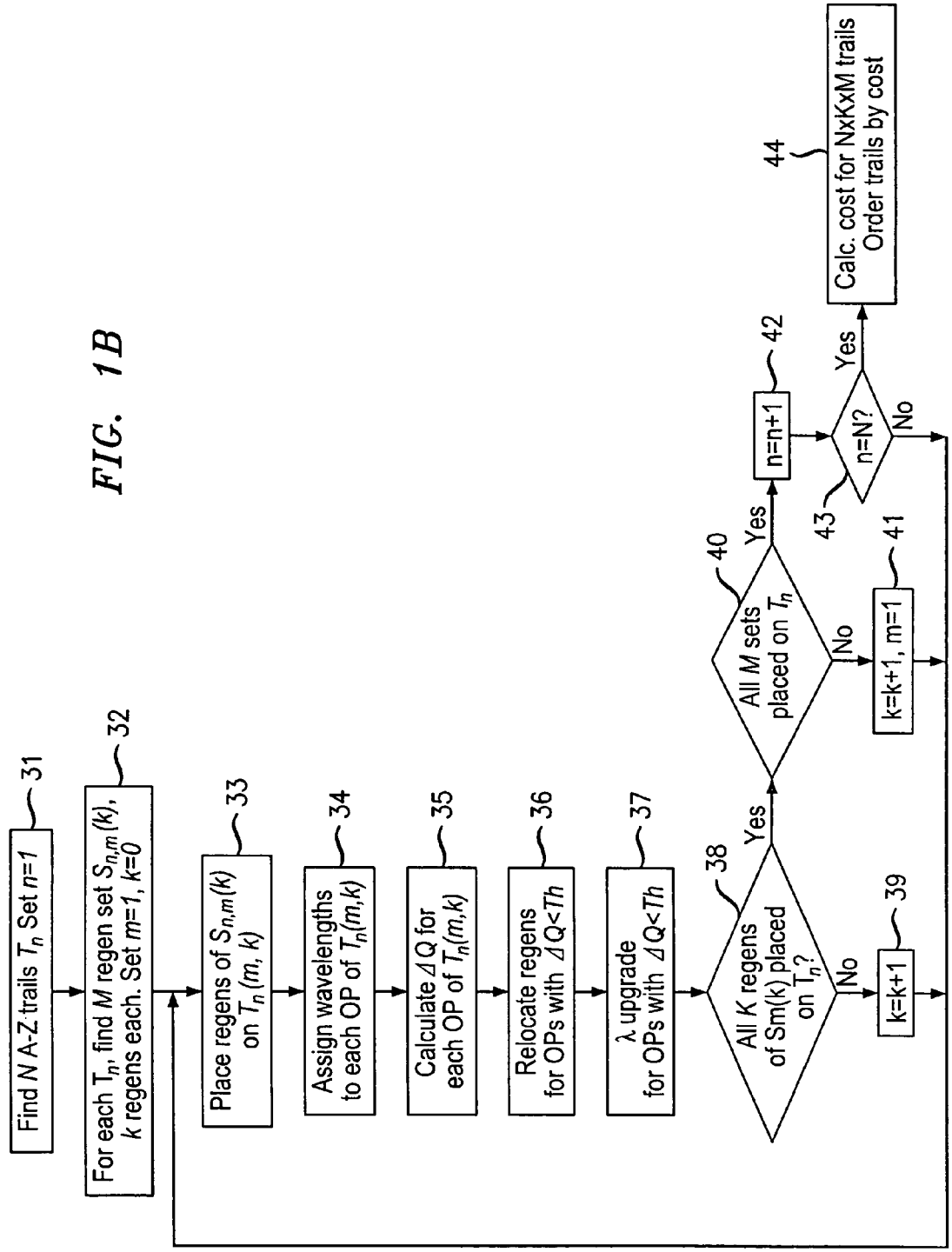
FIG. 1B is a high-level flow chart showing trail selection in an agile photonic network.

For convenience, a high-level flow-chart of the routing and switching mechanism described in the parent U.S. patent application Ser. No. 09/909,265 is described next with reference to FIG. 1B.

As shown in step 31, routing management 22 finds N trail solutions connecting the end nodes A and Z. For example, an A-Z connection may be implemented along a plurality of A-Z trails $T_n$, each passing through different intermediate nodes. In turn, each A-Z trail with known intermediate nodes may use a different number of regenerators/wavelength converters. Thus, for each trail $T_n$, the RPM 23 finds M variants $S_m(k)$ of K regenerators each, step 32. A set $S_m$ comprises all variants of placement for up to K regenerators. As a very simple example, for a trail with 4 intermediate nodes, one may use one set S1(4) of k=4 regenerators (with one regenerator at each intermediate node), 4 sets S1(3)-S4(3) of k=3 regenerators (placed at three out of four nodes), 6 sets S1(2) of k=2 regenerators (placed at two out of four nodes), 4 sets of S1(1) of k=1 regenerators (placed at any intermediate node). However, if M=4, only four sets are considered for k=2, even if 6 are available. N, M and K are selected having in view the computational time, and also that not all trails are viable, due to the conditions on the respective variant. It is to be noted that for k=0, there is no regenerator to be placed, and the set comprises only one variant.

It is to be noted that not all variants of regenerator placement are viable; factors such as the distance between the intermediate nodes, availability of regenerators at intermediate nodes and of wavelengths on each optical path and estimated path performance, are all taken into consideration to increase the chances of successful set-up for the selected solution. Thus, in step 33, the RPM 23 "places" the regenerators on the respective trails, and calculates the trails one by one, and in step 34, WAM 24 assigns a wavelength to the respective trail under consideration path $T_n$, based on the wavelength performance information 20.

The Q calculator 18 is invoked to estimate the ΔQ for each optical path of the trail, step 35. If one or more optical paths of a trail fail the ΔQ test, the routing management platform 10 performs regenerator relocation as shown in step 36, by "moving" the regenerator at the end of a failed optical path by one hop; and Qquick is used for estimating the performance of the new regenerator paths. A wavelength upgrade is also performed in step 37, also using Qquick.

Once performance of all regenerator paths has been estimated, as shown by the "Yes" branch of decision blocks 38, 40 and 43, the cost of the each Tn(R,λ) is calculated, and after all N trails were calculated, the trails are ordered by cost in the list 26. Branches 'No' of decision blocks 38, 40 and 43 show how search continues until a maximum number N×M×K of regenerator trails are found.

Details on how the routing management addresses various scenarios are not provided here; the areas of improvement are underlined next. As indicated above, the initial regenerator placement on a trail $T_n$ shown in step 33 is based on information such as the length of the optical paths, the availability of wavelengths on each optical path, the fiber type on each optical path, using wavelength performance data 20 and network configuration data from DTS 15. The likelihood that step 33 will fail to provide K×M solutions is high, particularly when the fiber on one or more paths of the trail are under-performing (with respect to the manufacturer's specification). Also, the likelihood that the solutions provided would succeed when the trail is lit is limited by the fact that the wavelength assignment is based on WPD 20 that provides an approximate performance parameter ΔQ. Furthermore, the initial wavelength assignment shown in step 34 is based on the pre-provisioned information in tables 20, so that this step may also fail if the data in tables 20 is too aggressive.

Regenerator relocation step 36 and wavelength upgrade step 37 use both Qquick for estimating the performance of the new regenerator paths, and are successful only if the actual profile of the path agrees with the assumed profile. Therefore, these steps may fail to provide a better trail than the initial trail. The present invention attempts to optimize these regenerator placement and wavelength assignment steps described above.

In the following, the term "placed" is used to identify attempts to use (automatically connect) a regenerator at a certain node and therefore specifies a possible (theoretical) variant of a trail; the actual (physical) placement identifies the node where a regenerator will be actually connected along the respective trail takes when the trail is lit. In the variant proposed in this patent application, the initial regenerator placement is performed based on the maximum reach, and the regenerators are initially placed equidistantly along the trail. A distance factor 'd' may be used to make this distance more aggressive on the first regenerator, if so desired. The regenerator relocation and wavelength upgrade steps will shift the regenerators to a less aggressive reach location to converge on a workable solution.

The initial wavelength assignment according to this invention is performed based on a bin profile, rather than on the performance of each individual wavelength, as provided in the above-identified co-pending U.S. patent application Ser. No. 10/128,092. Thus, all wavelengths available in the respective wavelength plan (W) are arranged in performance bins, and each bin assumes the ΔQ of a wavelength of a "profile wavelength". In the preferred embodiment, the profile wavelengths is in the middle of the respective bin, but other wavelength in the bin may be used as the profile wavelength. In this way, the number of representative sample points used for the initial wavelength selection is reduced, these points being chosen as a tradeoff to execution time. ΔQ (or the estimated margin) is calculated as the difference between the quick variants of the Qtest and Qest, but based on the actual selection of the transponders, since the regenerator placement is known.

Given that the quantization error of only having w Q values rather than W, certain error conditions need to be handled. For example, if the ΔQ for a selected wavelength fails after the ΔQ for the bin passed, then an upgrade to a better bin is performed. Also, since the selection is rather based on Qquick and not on Qcomplete, if Qcomplete indicates that a wavelength fails where Qquick said it will pass, the trail is abandoned and the next trail is taken-up for regenerator placement and wavelength assignment. (To reiterate, all trails provided by the RM 22 are engineered, then Qcomplete is calculated for the least cost one and if it passes the threshold test, it is sent for setup.

It is also proposed here to use different thresholds against which the estimated margin ΔQ is compared at different points during the regenerator placement and wavelength assignment, as listed below:

ΔQiniRegen_thrsh is a Qfail-derived threshold used to decide whether the Qest of the center-wavelength of a bin is sufficient to consider all the wavelengths in the bin for wavelength assignment. This is referred to as the "initial threshold".

ΔQassign_thrsh is a Qfail-derived threshold used to decide whether the Qest of a candidate wavelength is sufficient to assign it to the optical path. This is referred to as the "assignment threshold".

ΔQupgrade_delta is a Q value to be added to ΔQiniRegen_thrsh and ΔQassign_thrsh in each subsequent "upgrade" scenario, to increase the probability of connection success. This value can be different for any given upgrade so that the desired connection success probability can be achieved. This threshold is referred to as the "threshold increment" or "increment".

A more stringent Qfail threshold is applied on each subsequent connection attempt.

By using these thresholds the probability of success of a given connection increases at each attempt in a deterministic manner: for example, the $1^{st}$ trail will have a 50% probability of connection success, while the last trail will have a 99%+ probability of connection success. The upgrade for higher probability of success is determined by increasing the required margin (i.e. using☐ ΔQupgrade_delta), the Qest-Qtest (ΔQ, estimated margin) is driven higher for a higher probability of success solution. As before, the number of attempts (N×M×K) is configurable.

In addition, the regenerator relocation is performed based on a unidirectional Q value Quni when the fiber along the trail is homogeneous, and is based on a bidirectional Qbidir for heterogeneous fibers. The bidirectional Qbidir assumes a worst-case value. Alternatively, Qbidir may be used for both homogeneous and heterogeneous fibers.

Figure 2:
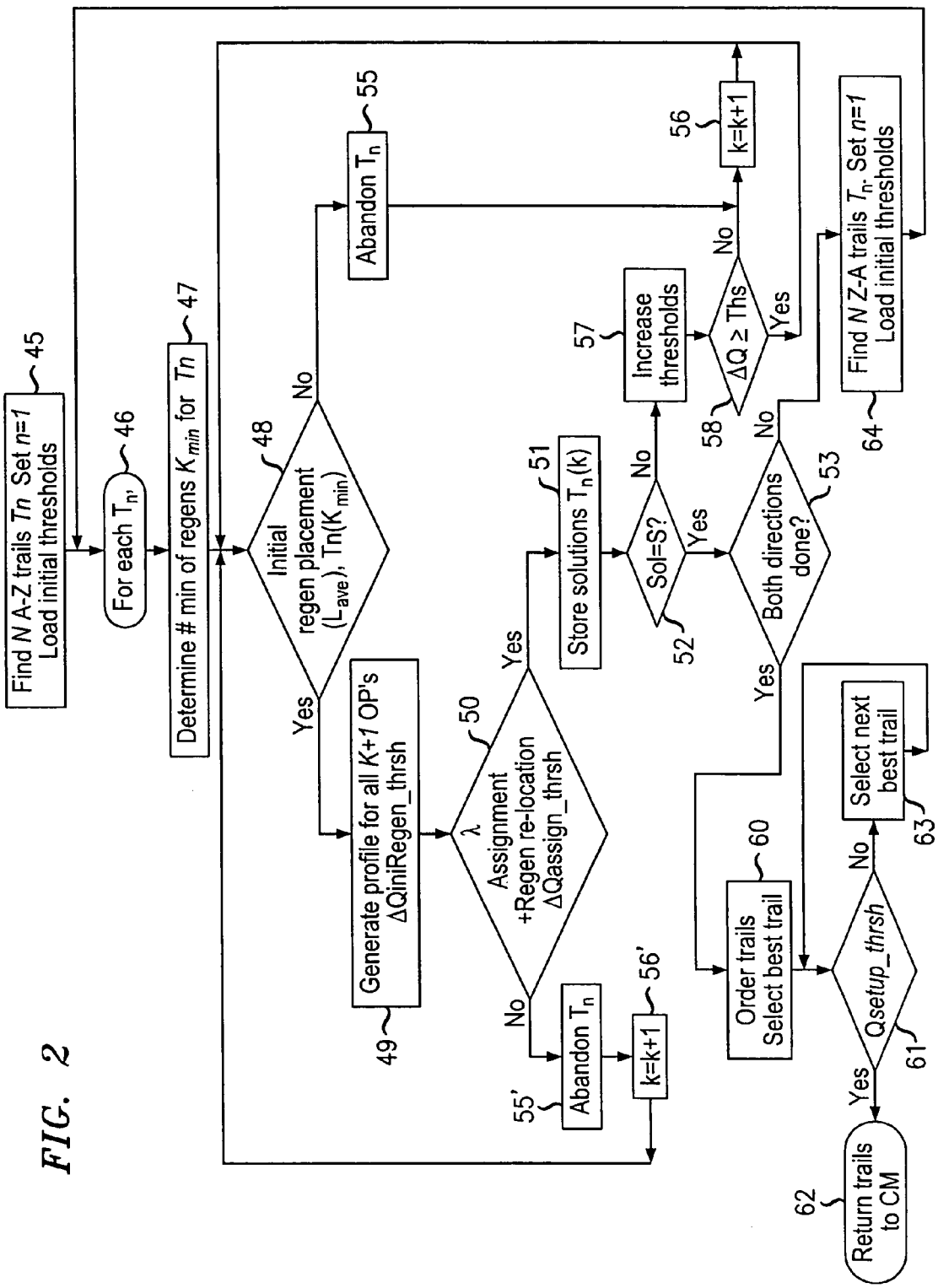
FIG. 2 is a flowchart showing trail selection in an agile photonic network according to an embodiment of the present invention.

FIG. 2 shows the flowchart of the trail selection in an agile photonic network according to an embodiment of the invention. It is to be noted that the flowchart of FIG. 2 shows the main steps of the method according to the invention, details are provided by way of examples in the remaining Figures.

Step 45. The routing management platform 10 first finds N A-Z trails, and loads the thresholds discussed above, which are used for regenerator placement along each trail and wavelength assignment on each optical path resulted from the respective regenerator placement.

Step 46. Determine the Minimum Number of Regenerators $K_{min}$

Figure 3:
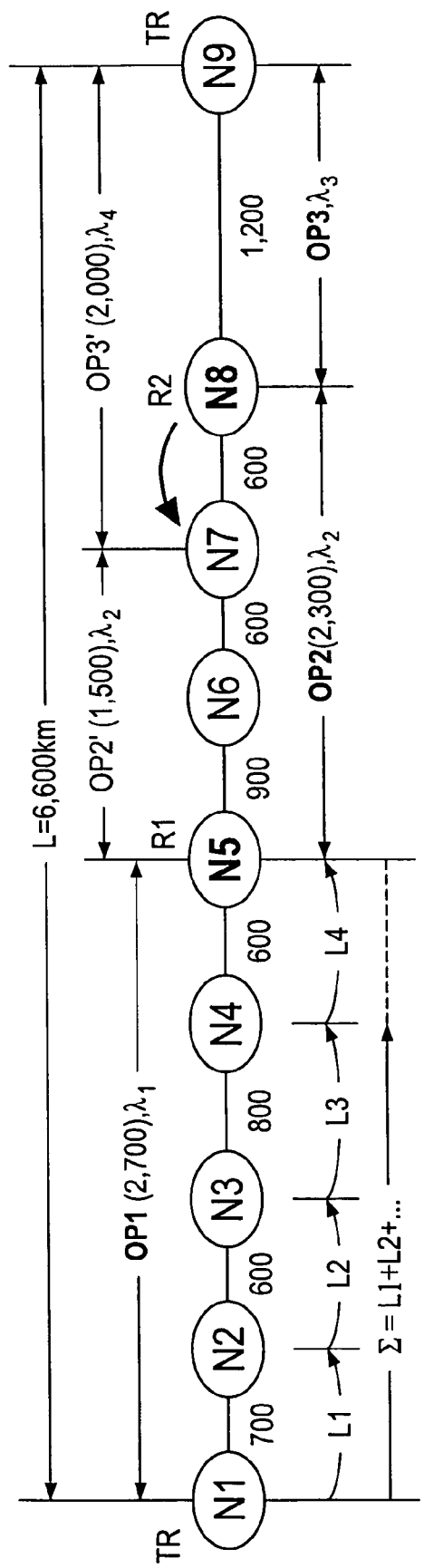
FIG. 3 is an example of an A-Z trail illustrating initial regenerator placement and wavelength assignment to optical paths of the trail.

The minimum number of regenerators $K_{min}$ needed to carry the signal between the end nodes A and Z is determined next. FIG. 3 provides an example of a trail with nine nodes N1 (source node of the trail) to N9 (the sink node of the trail), and a total length L=6,600 km. Each link between two adjacent nodes may use a different type of fiber. The fiber precedence is obtained during step 46 from the fiber table 20 (which is ultimately loaded from the DTS 15). For this step, the maximum reach attainable is the deciding performance parameter of the fiber types. Let's assume for the example of FIG. 3 that:

| LEAF = 0x01 | MaxReach = 4,500 km |
|---|---|
| TWC = 0x02 | MaxReach = 4,000 km |
| DCF = 0x04 | MaxReach = 2,500 km |
| SMF = 0x08 | MaxReach = 2,000 km |

If we assume that the trail has all these fiber types, LEAF fiber is the best fiber on trail having a maximum reach of 4,500 km, hence the LEAF profile is used for determining the number of regenerators if the trail has at least one LEAF link.

$K_{min}$ is determined by "walking down the trail" from node N1 to node N9 and adding-up the length of each link, $\Sigma = L1 + L2 + \ldots$ A counter Regen_Count that keeps the current numbers of regenerators for the respective path is increased by one whenever $\Sigma \geq MaxReach_{LEAF}$. In this case, $K_{min}=1$ and the first regenerator is placed at node N7. For a trail with MaxReach=2,500 (should the trail not include LEAF and TWC fiber links), the minimum number of regenerators is $K_{min}=2$, since $\Sigma$ exceeds MaxReach for the first time at node N5 and the second time at node N8. $K_{min}$ is then used to determine the average optical path length $L_{ave}$:

$$L_{ave} = L \times c / (K_{min} + 1) \quad \text{EQ1}$$

This calculation uses a configurable parameter c to obtain a more aggressive average distance; let's assume that c=1, which gives a $L_{ave}$=2,200 km for this example.

Step 48. Initial Regenerator Placement

The initial regenerator placement begins with the source node A, by adding-up the lengths of the links $\Sigma = L1 + L2 + \ldots$ and comparing this sum against $L_{ave}$. The term "placing" refers to logically placing the regenerator at a certain tentative regeneration site. The actual placement (connection) of regenerators on the respective trail takes place when the path is lit.

At the same time, RMP 10 looks if a continuous wavelength is available for the respective optical path. If the sink node Z is reached in this way, the initial regenerator placement is successful, as shown by branch "Yes" of decision block 48. Having this in mind, the regenerators are initially placed at node N5 and respectively node N8, for the DCF example, also having in view that the Max_Reach distance cannot be exceeded, and also assuming that:

nodes N5 and N8 are equipped with a regenerator that is currently in stand-by and can be allocated to trail N1-N9 (hardware connectable on the trail). It is to be noted that nodes that do not have an available regenerator at the time when the new trail N1-N9 is constructed, are removed from consideration.

there is no user constraint explicitly excluding these sites as regenerator sites, or requiring explicitly another regenerator site.

continuous wavelengths $\lambda 1$, $\lambda 2$, $\lambda 3$ are available on the resulting optical path OP1, OP2 and OP3.

Nodes N5 and N8 are referred to as "tentative regeneration sites" being selected for an initial regenerator placement. This placement may change, as seen later.

If during the initial placement $L_{ave}$ falls between two potential regenerator sites, the site that is further away from the start of the respective optical path is selected, as shown in the example of FIG. 3. Thus, OP1 has a length $L_{OP1}$=2,700 km, OP2 has a length $L_{OP2}$=2,300 km, and OP3 has a length of $L_{OP3}$=1,200 km.

If $L_{ave}$ cannot be reached because a continuous wavelength $\lambda 1$, $\lambda 2$ or $\lambda 3$ is not available for the respective optical path, and the number of regenerators already placed is less than the total number of regenerators for that trail, and the link is not the first link of the optical path, then an upstream node is tried as an eventual regenerator site (backtrack, or left shift). An example is provided in FIG. 3 for OP2, when the first regenerator R1 was placed at N4, so that Regen_Count=1 which is less than $K_{min}$. In this case, if no continuous wavelength $\lambda 2$ is available between nodes N5 and N8, regenerator R2 is "shifted" towards the source node N1 (backtracked), namely from node N8 to N7, to be initially placed at node N6. In this case, both OP2 and OP3 are affected; however, path OP3 has not been calculated yet.

However, if after this shift the length of the OP3 becomes greater than MaxReach, the trail is abandoned, as shown by branch "No". In the example of FIG. 3, by moving R2 at node N7 from node N8, the lengths of OP3 becomes 2,000 km, which is still less than the MaxReach, so that a trail solution with regenerators at nodes N5 and N7 may be viable, branch 'Yes' of decision block 54. However, the trail is abandoned if a continuous wavelength is not available on path N7-N9, as shown by branch 'No' of block 48. A new regenerator trail is tried; the counter Regen_Count is increased from 2 to 3 regenerators, resulting in four optical paths, shown in steps 55, 56.

Similarly, if a continuous wavelength is not available, all regenerator available for that trail (Regen_Count) were placed, and/or the link is the first link of the optical path, the respective regenerator trail is abandoned, steps 55, 56, since no backtrack is possible in this case for N1. At the same time, the Regen_Count is increased by 1, step 56. It is also possible that a trail cannot be engineered with K regenerators (i.e. regenerators cannot be placed at appropriate locations to obtain a sufficient Q margin for an optical path). If this happens, then there is no use to perform step 56 (attempting to add a regenerator to the trail). Such a trail is called "un-engineerable" and is completely abandoned.

To guard against such a scenario where a trail is un-engineerable because of wavelengths and/or regenerators not being available at necessary locations, an intermediate path validation stage may be used (not shown). This stage may be executed immediately after step 45 and checks for the following:

1. Availability of continuous wavelengths (in both directions) between each node on which regenerators are available. This ensures that any path uncovered by the engineering mechanism will always have continuous wavelengths available between two successive regenerator sites.
2. Successive regenerator sites are less then MaxReach apart.
3. A regenerator is available in the correct regenerator pool at a location specified in a node-include constraint.

If any of the above pre-engineering check fails, the trail is rejected and not processed any further and RM 22 then finds an additional trail. In other words, RM 22 applies these rules to select N trails, to ensure high probability of success for engineering a trail without sacrificing much on processing time.

Step 49 Profile Generation

Profile generation is performed in step 49 for each pondered optical path (OP). This allows to immediately shift a regenerator location (left shift or right shift) if the path fails to meet the threshold margin.

The wavelengths available across the entire network are organized into wavelengths tables (bins) 20, pre-stored during link commissioning. An example of such a table is Table 1 provided below, where all available wavelengths ($\lambda 1$ -$\lambda 100$) are grouped according to their performance in the bins. For convenience, the wavelengths may further be separated in each bin into odd and even wavelengths. A bin may have 9, 10 or 11 wavelengths. The test wavelength is a wavelength selected in the middle of the respective bin, namely $\lambda 5$ for bin 1, $\lambda 15$ for bin 2, $\lambda 25$ for bin 3, $\lambda 35$ for bin 4, $\lambda 45$ for bin 5, $\lambda 55$ for bin 6, $\lambda 65$ for bin 7, $\lambda 75$ for bin 8, $\lambda 85$ for bin 9, and $\lambda 95$ for bin 10. This is the wavelength used to calculate the bin $\Delta Q$ during the initial regenerator placement.

threshold is selected; the $\Delta Q$ is not calculated for the reminder of the bins at this time for saving time.

Let's say for the example of FIG. 3 that bins 1, 2, 5, 6, 8 and 10 have wavelengths available for optical path OP1, and that $\Delta QiniRegen\_thrsh$ is set at 0.3 dB. The $\Delta Q$ for the available bins is shown in the last row of the Table. In the above example, the first bin that meets the $\Delta QiniRegen\_thrsh$ test is bin 6 with a $\Delta Q$ of 0.4 dB, so that bin 6 is selected. The bins selected for wavelength assignment are called "qualified bins".

Step 50 Wavelength Assignment and Regenerator Re-Placement

Now the $\Delta Q$ for the reminder of the available bins (bins 8 and 10 in the example shown in the Table) is calculated and the $\Delta Q$ of all qualified bins is compared with the threshold $\Delta Qassign\_thrsh$, which is less than $\Delta QiniRegen\_thrsh$. The bins are next sorted according to the assignment threshold, and a bin with the profile closest to the $\Delta Qassign\_thrsh$ is identified; an attempt to select a path wavelength starts with this bin. As discussed in the co-pending U.S. patent application Ser. No. 10/128,092, the routing management 10 will

TABLE 1

Binning table with bin test wavelength and bin profiles

| | Bin # | | | | | | | | | |
|---|---|---|---|---|---|---|---|---|---|---|
| | 1 | 2 | 3 | 4 | 5 | 6 | 7 | 8 | 9 | 10 |
| Even $\lambda$ | 2, 4, 6, 8, 10 | 12, 14 16, 18, 20 | 22, 24 26, 28, 30 | 32, 34, 36, 38, 40 | 42, 44 46, 48 | 50, 52, 54, 56, 58, 60 | 62, 64, 66, 68, 70 | 72, 74 76, 78 | 80, 82, 84, 86, 88, 90 | 92, 94, 96, 98, 100 |
| Odd $\lambda$ | 1, 3, 5 7, 9 | 11, 13 15, 17 19 | 21, 23 25, 27 29 | 31, 33 35, 37 39 | 41, 43 45, 47 49 | 51, 53 55, 57 59 | 61, 63 65, 67 69 | 71, 73 75, 77 79 | 81, 83 85, 87 89 | 91, 93, 95 97, 99 |
| Test $\lambda$ | 5 | 15 | 25 | 35 | 45 | 55 | 65 | 75 | 85 | 95 |
| $\Delta Q$ | −0.5 | −0.3, | | | 0.2 | 0.4 | | 1.0 | | 0.1 |

The bins that don't have any available wavelength at the time the new trail is calculated are removed from consideration; the bins that have available wavelengths are called available bins.

To enhance the wavelength assignment process, the bin order in the Table 1 and the order of profile generation may be arranged based on the knowledge of intrinsic wavelength performance. For example, a better order of the bins in Table 1 is bin 7, bin 6, bin 8, bin 5, bin 9, bin 4 bin 10, bin 3, bin 1 and bin 1. The bin profile is generated only until a bin with a good enough margin is found (with a margin greater than the threshold), and the profile generation for the optical path is deferred until the wavelength assignment step, in order to reduce the time on generating profiles for the respective OP, as the OP may change during regenerator re-placement.

Then, the bins are ordered in decreasing order of potential reach of their wavelengths, considering all different fiber types.

Every time a new OP is determined, or a previous OP is modified by any kind of regenerator/s repositioning, the $Q_{quick}$ is called to build a current wavelength profile for that path. The $Q_{quick}$ is called for calculating the unidirectional $\Delta Q$ for the test $\lambda$ ☐ of the respective available bins, in the case that the optical path uses the same fiber type in both directions (homogenous OP). For optical paths that do not have the same fiber type for both directions, the bidirectional $\Delta Q$ returned by $Q_{quick}$ is the minimum of two samples for with non-homogeneous optical paths East and West of the optical path under consideration. Each $\Delta Q$ is compared with an initial threshold $\Delta QiniRegen\_thrsh$ and the first bin with a $\Delta Q$ higher than this look for the most fragmented wavelength in this bin, so as to minimize wavelength fragmentation as much as possible. Various optimizations may be envisaged to the selection process by adding rules to wavelength rules block 27. An example of rules that take into account SRS (simulated Raman scattering) when selecting the wavelengths of co-propagating channels is provided in the above-identified co-pending U.S. patent application Ser. No. 10/391,863.

In the example provided here $\Delta Qassign\_thrsh$ is 0.0 dB, in which case bin 10 with a $\Delta Q$ of 0.1 dB most probably has a wavelength suitable for assignment to OP1 of FIG. 3, and that is most fragmented. Let's assume that this selected (or eligible) wavelength is $\lambda 97$ (i.e. $\lambda 1$ is $\lambda 97$).

Next, the performance of this selected wavelength ($\lambda 97$ in the example) is calculated taking into account the parameters of the actual path, since the characteristics of the path (regenerators, configuration of the access path, etc) are now known. If the $\Delta Q$ performance of this wavelength is satisfactory with respect to the $\Delta Qassign\_thrsh$, then that wavelength is selected for the respective optical path.

If $\Delta Q$ for the selected wavelength fails, the next bin with the $\Delta Q$ closest to the $\Delta Qassign\_thrsh$ is considered, a most fragmented available wavelength is selected again and the $\Delta Q$ of this new wavelength is compared to the threshold. This operation is repeated until a wavelength passes the $\Delta Q$ test, in which case the optical path is declared complete, and wavelength assignment is performed for the next path of the trail, until all optical paths of the trail are completed. This automatic wavelength upgrade increases the probability of success for finding a viable optical path. In the above example, after bin 10, bin 5, and then bin 6 and bin 7 are tried.

Once wavelength were assigned for all optical paths of the trail, as shown by branch 'Yes' of decision block 50, the respective trail solution is stored, step 51.

If no wavelength in the selected bins passes the ΔQassign_thrsh threshold, the optical path is declared failed and the operation is continued with the next path, until all optical paths of the respective trail are assessed. An attempt to fix a failed optical path is made with a view to still use some trail data calculated so far, which may result in important time saving. This may be performed by re-placing the source regenerator one node downstream, re-placing the sink regenerator one node upstream, or re-placing both. Preferably, a single shift is enabled for time considerations.

For example, if OP2 of FIG. 3 fails the ΔQassign_thrs test, R1 could be moved from N5 to N6 to shorten the length of OP2; this implies re-calculating OP1, but not OP3. If ΔQ still fails, then, with R1 back at N5 OP2 may be shortened by moving R2 from N8 to N7; this implies re-calculating OP1, but not OP3. If OP2 passes, the trail is complete. If OP2 still fails, the trail with two regenerators is abandoned, as shown by branch 'No' of decision block 50 and steps 55', 56'.

An under-performing optical path on the extreme right side of the trail (i.e. when no left shifts can be performed) may be corrected by recursive displacement of the regenerators to the right.

Step 57. Increase the Thresholds

The maximum number of solutions computed by the RMP 10 is limited to S, which depends on the number of physical trail variants N and the number of regenerator placement alternatives found for each trail variant. If the maximum number of solutions S has not been reached yet, branch 'No' of decision block 47, the initial and assignment thresholds are increased by a preset increment ΔQupgrade_delta and regenerator placement starts again using the last Regen_count as the starting point. This enables obtaining an increased number of solutions with the same number of regenerators and same physical trail, reducing the execution time if a new physical solution is taken into consideration.

It is also possible to cache all profile data calculated for a solution and try the solution for setup. Only if that solution fails Qmeas test, the next best solution is tried. Also, for a 0:2 protection type call (two diverse trails) one path may be upgraded only if the other trail doesn't fail Qmeas.

Trail Set-Up

The regenerator trail (i.e. the trails with the optical paths established as above) is stored and the next solution is searched for. If a preset number S of solutions was attained, branch 'Yes' of decision block 52, trail selection continues with the reverse direction, as shown in steps 64, 46 etc. Reverse direction is processed exactly as the forward direction, by simply inverting nodes A and Z, and taking each physical trail solution, populating it with regenerators, and assigning wavelengths to each optical path of the respective trail.

Once both directions of the respective A-Z connection have been processed, branch 'Yes' of decision block 53, the cost of each solution is calculated as described in the above-identified co-pending U.S. patent application Ser. No. 09/909,265. In short, total cost for each solution is obtained by adding the cost for all regenerators placed on that trail with the cost of all wavelengths assigned to the trail solution (fiber type and length of the path), as shown in step 60. A cost multiplier for each optical path may be applied based on the ΔQ values for the wavelengths assigned to the respective optical path. The trails are ordered and prior to hading them over (one by one) to the CM11 (see FIG. 1A). The solutions with the same rank are compared and the one with lesser number of regenerators is tried first. If the number of regenerators is the same, then the lowest cost solution is selected.

Also, the $Q_{complete}$ is run for each optical path of the trail and for each direction in the optical path. The ΔQ value obtained for each OP is compared against a ΔQsetup_thrsh threshold, step 61. If ΔQ is less then this threshold, branch 'No' of decision block 61, the trail solution is rejected and the next in the list trail solution is tested for the $Q_{complete}$, as shown in step 63. Namely if the threshold check fails for any OP in any direction in either trail, both trails of the pair are rejected and threshold check is done for the next on the list pair of trails. Please note that the set-up threshold ΔQsetup_thrsh is a configurable value, which does not change for the call. The lower the ΔQsetup_thrsh, the better the chances of a successful trail set-up.

If the first trail solution setup attempt fails, (not shown) $Q_{complete}$ is run again on the next solution on the list with next higher cost. Preferably, the solutions that have a rank lower than the last tried solution are omitted.

The bi-directional process shown in the flowchart of FIG. 2 refers to engineering each path independently starting first from node A and then starting from node Z. There is also possible to generate bi-directional Q-profiles for each optical path on both directions.

EXAMPLES

FIG. 4A shows a heterogeneous trail with nine nodes, L=5352 km, and with the four fiber types SMF, DCF, TWC and LEAF. This trails is used together with FIGS. 3B and 3C for illustrating an example of an initial regenerator placement. Since in this scenario the best fiber type LEAF has the Max_Reach of 4,500 km, there is at least one regenerator needed. $L_{ave}$ for this trail is 5352/2=2676 km, considering d=1. As before, let's assume that the initial threshold is 0.3 dB, the assignment threshold is 0.0 dB, and the increment (used later) is 0.4 dB.

Initially, the regenerator is placed at node N6, since Σ(Σ=L1+L2 L3+L4+L5=2,852 km), is first greater than $L_{ave}$ at node N6, resulting in a first optical path OP1 between nodes N1 and N6 (L1=2,852 km) and a second optical path OP2 between nodes N6 and N9 (L2=2,500 km).

The trail construction starts with WAM 24 checking for a continuous wavelength for OP1. Let's assume that a continuous wavelength is available in all bins. The bin profiles are calculated next for the respective test λ, and bin 4 is the first that has a ΔQ better than the ΔQiniRegen_thrsh, as shown in FIG. 4B. The profiles for bins 5-10 are not calculated now; they are shown therefore in dotted lines.

The trail construction continues with WAM 24 checking for a continuous wavelength for OP2. Let's assume that a continuous wavelength is available in a number of bins. The bin profiles are calculated for the respective test λ, and bin 3 is the first that has a ΔQ better than the ΔQiniRegen_thrsh, as shown in FIG. 4C. The profiles for bins 4-10 are not calculated yet.

Initial regenerator placement was successful in this example. WAM 24 now continues calculating the profiles for the reminder of the bins, for each optical path OP1 and OP2.

Next, the bins are sorted according to the performance of the respective test λ, as shown in FIGS. 4D and 4E. WAM 24 initially selects the most fragmented wavelength available from the bin with the lowest ΔQ value above the threshold ΔQassign_thrsh. As seen on FIGS. 4D and 4E, these are bin 2 for both OP1 and OP2. Only bins with ΔQ greater or equal to ΔQassign_thrsh are sorted (which are all bins in this example). Let's say that these are λ16 for OP1 and λ19 for OP2.

With the regenerator placed at node N6 and wavelength assigned to the optical paths, the path performance is now calculated using Qquick; let's say that OP1 fails. To still qualify OP1, WAM 24 automatically upgrades the wavelength by moving to the next bin on the sorted graph for OP1 (FIG. 4D), which has a better performance. This is bin 3, let's say that the most fragmented available wavelength in bin 3 is λ30. $Q_{quick}$ is called and now OP1 passes the ΔQ test. OP1 and OP2 now represent a complete solution.

To obtain a further solution for these paths, the decision threshold is now increased by the increment, so that for this example, the new thresholds are: ΔQiniRegen_thrsh=0.7 dB and ΔQassign_thrsh=0.4 dB.

Using the new thresholds, it can be seen on FIGS. 4F and 4G that all bins fall short of the new ΔQintiRegen_thrsh threshold. In this case, the path is abandoned, and a new regenerator scenario path is calculated for the same physical trail, but with an additional regenerator. If one or more of the OPs ΔQ values are above the new thresholds, then regenerator placement is again performed for the k regenerator scenario before moving onto the k+1 regenerator scenario.

For the example of FIGS. 4A-4F this means that a solution with k+1=3 regenerators is now considered, shown in FIG. 5A. In this scenario, $L_{ave}$=5352/(k+1)=5352/3=1784 km, and the first regenerator is placed at node N5, where Σ=L1+L2 L3+L4=2,252 km is greater than $L_{ave}$. It should be noted that even though in terms of distance node N4 (1752 km) is closer to the $L_{ave}$, node N5 is chosen because the method of the invention always attempts to err on the aggressive side. Now the first optical path OP1 has L1=2,252 km. As before, in order to assign a wavelength to this path, WAM24 checks for a continuous wavelength between nodes N1 and N5; a continuous wavelength is available in all first five bins, and now the first bin that has a profile above the new threshold ΔQiniRegenλthrsh is bin 5. To reiterate, the bin profile is calculated for the test wavelength λ45, and the profiles for bins 1-5 are stored, while the regenerator placement continues.

The next node that satisfies the average distance is node N8 (the distance from node N5 to node N8 is 2,300 km), so that the second regenerator R2 is placed at this node. If we assume that a continuous wavelength is not available for OP2, RM22 (see FIG. 1A) attempts to move R2 back towards node N5. If we assume that a regenerator is available at node N7, and a continuous wavelength is available. The profile of OP2 is now calculated, and the ΔQ for value for bin 2 is above the incremented threshold ΔQiniRegen_thrsh. The profiles for the bin 1 and 2 are stored, and the profile of OP3 is next calculated.

We also assume that there is a continuous wavelength available for OP3 and the ΔQ value of bin 28 is above the incremented ΔQiniRegen_thrsh, as also shown in FIG. 5C.

The ΔQ values for the remaining bins are computed now for each optical path and then the values are sorted in increasing order of ΔQ, as shown in FIGS. 5C-5F. WAM 24 then initially selects the most fragmented wavelength available from the bin with the lowest ΔQ value above the current ΔQassign_thrsh (0.4 dB). Only bins with ΔQ greater or equal to ΔQassign_thrsh are sorted. WAM 24 picks the most fragmented wavelength from each respective bin, namely λ37 from bin 4 for OP1, λ20 from bin 2 for OP2 and λ22 from bin 3 for OP3.

Next, WAM 24 calls $Q_{quick}$, which calculates the ΔQ for the first optical path OP1 for the selected wavelength. Let's assume that the ΔQ test on OP1 fails. Another wavelength is selected from the next best bin, and again tries to assign the most fragmented wavelength to the path and again calculate ΔQ for this new wavelength. Assuming that the ΔQ test fails again, WAM 24 moves to the next bin, bin 5 and again the ΔQ test fails. This process continues until WAM 24 has tried the last bins; therefore in this example OP1 fails. As a result, WAM 24 abandons path OP1 and continues wavelength assignment for OP2 and OP3, as described above. Namely, WAM 24 invokes $Q_{quick}$ for determining the ΔQ for the wavelength selected for the remaining paths OP2 and OP3; we assume that the ΔQ test passes for λ20 (OP2) and λ22 (OP3).

Figure 8A:
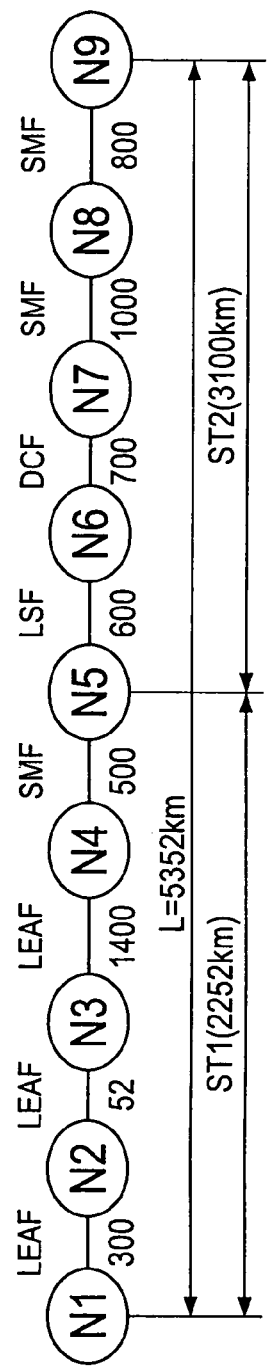
FIGS. 8A-8C show an example of a call that has a hard regenerator constraint.

Since OP1 failed, RPM 23 now moves R1 upstream (to the left on FIG. 5A), i.e. at node N4 as shown in FIG. 8A and calls WAM 24 to generate ΔQ for the new OP1' (N1-N4) and checks it against the new initial threshold ΔQiniRegen_thrsh; assume that a wavelength is now found. RPM 23 also calls WAM 24 to generate and check ΔQ for the new OP2' (N4-N7), and this path also passes the test, so that a wavelength is also found for OP2.

The remaining ΔQ values are computed the bins that have a continuous wavelength available between end nodes of OP1' and OP2', and the values are sorted as before in increasing order of ΔQ, as shown in FIGS. 6B and 6C. WAM 24 ignores OP3 since OP3 has not changed. Again the most fragmented, available wavelength from the bin with the lowest ΔQ value above ΔQassign_thrsh (0.4) is chosen. In the example of FIGS. 6B and 6C, these are bin 4 for OP1 and bin 2 for OP2. Once WAM 24 has chosen a wavelength, Qquick is called and the ΔQ value return is compared against above ΔQassign_thrsh. Let's now assume that ΔQ test passes for the new wavelengths on both OP1' and OP2'. OP1', OP2' and OP3 of FIG. 6A represents a completed solution.

Figure 7:
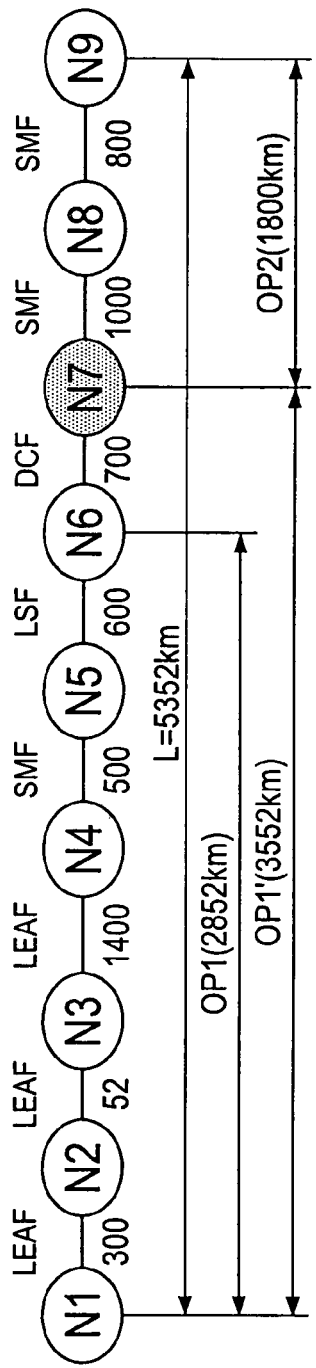
FIG. 7 provides a scenario where the regenerator placement and wavelength assignment are optimized by readjusting the average length before placing a new regenerator.

The example shown in FIG. 7 provides a scenario where the regenerator placement and wavelength assignment are optimized if the RPM 23 readjusts the average length each time before placing the next regenerator. This is true when the type of fiber on the remaining links of the trail do not enable a wavelength to reach the average lengths, and thus the node calculated for that regenerator.

Thus, for the trail of FIG. 7, the best fiber is LEAF, and all the links at the beginning of the trail use LEAF. As discussed in the example provided in FIG. 4A, $L_{ave}$=2,676 km based on the Max_Reach of 4500 km for LEAF, and the first regenerator R1 is placed initially at node N6. With the same $L_{ave}$=2,676 km, RPM23 would determine that the remaining 2,500 km could be easily accommodated without a second regenerator R2. However, since the fiber links remaining in the trail from node N6 to node N9 do not perform as well as the links with LEAF fiber, a solution may not be reached for OP2, and the trail could be abandoned. This is because the reach for DCF (2,000 km) and SMF (1,800 km) is below the needed distance of 2,500 km, so that N9 cannot be reached without inserting a second regenerator R2.

In this case, once RPM 23 determines that N9 cannot be reached, it will attempt to relocate R1 from node N6 to node N7 (downstream from node N6), in an attempt to shorten OP2. The new OP1' is passed to WAM 24 to check for a continuous wavelength that passes the ΔQ test for initial regenerator placement. If we assume that R1 can be successfully placed at N7, the remainder of the trail is now 1,800 km long and contains only SMF fiber. RPM 23 performs the same check as before and determines that the end of the trail could be reached, that a continuous wavelength is available and that the wavelength passes the ΔQ tests. Thus, a solution with only one regenerator is in fact possible, and it has been devised using adjustable average length for the remainder of the trail.

FIG. 8A shows an example of a call that specifies the end nodes (N1, N9) and a hard regenerator constraint. For example, let's say that the call specifies that if physical trail N1-N9 includes node N5, the trail must have a regenerator at node N5. This requirement is called a "hard regenerator constraint". In this case, the RPM 23 breaks the trail N1-N9 into sub-trails ST1 between N1 and N5 and ST2 between nodes N5 and N9, and calculates each sub-trail separately, as if each were a trail. After a solution is found for each sub-trail, the solutions are combined to form the final solution trail.

Figure 8B:
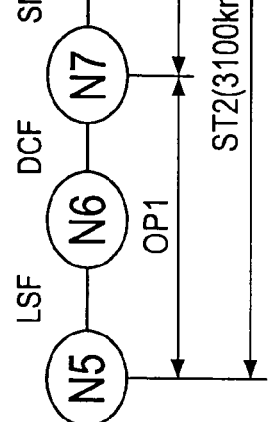

First, for ST1 shown in FIG. 8B, RPM 23 determines that it is possible to go from node N1 to node N5 without further regeneration. WAM 24 determines that there is a continuous wavelength available, and that the ΔQ values are above the thresholds. ST1 is complete.

Figure 8C:
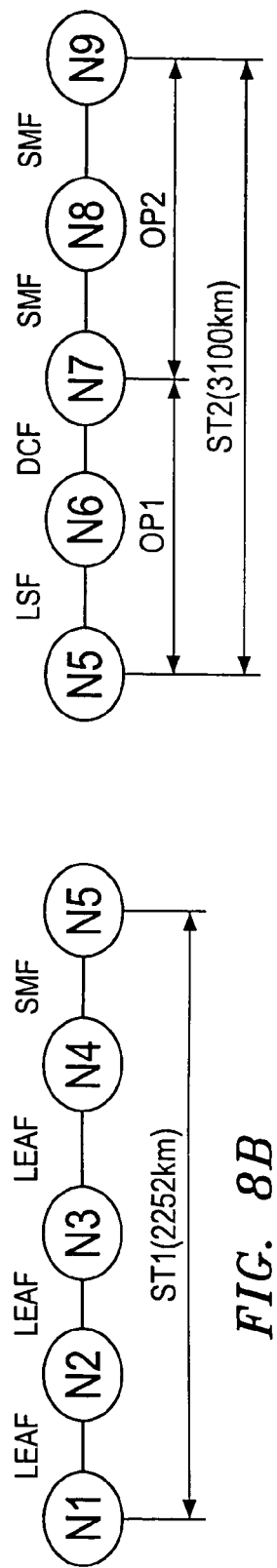

RPM 23 next processes ST2 shown in FIG. 8C. Let's assume that the best performing fiber on ST2 is SMF, which has a Max_Reach=2,000 km. Based on this, and on the length of the ST2, RPM 23 determines that ST2 will have two optical paths OP1 and OP2, and that a regenerator should be placed at node N7. Node N7 has a regenerator available, a continuous wavelength is available between N5 and N7, and also the ΔQ tests pass. Next RPM 23 and WAM 24 determine that it is possible to get from node N7 to node N9 without further regeneration. Sub trail ST2 is now complete.

Combining sub-trail ST1 and ST2 produces a first trail solution with a hard regenerator constraint. As before, the Q thresholds are increased and the whole process begins over looking for further solutions.

Figure 9:
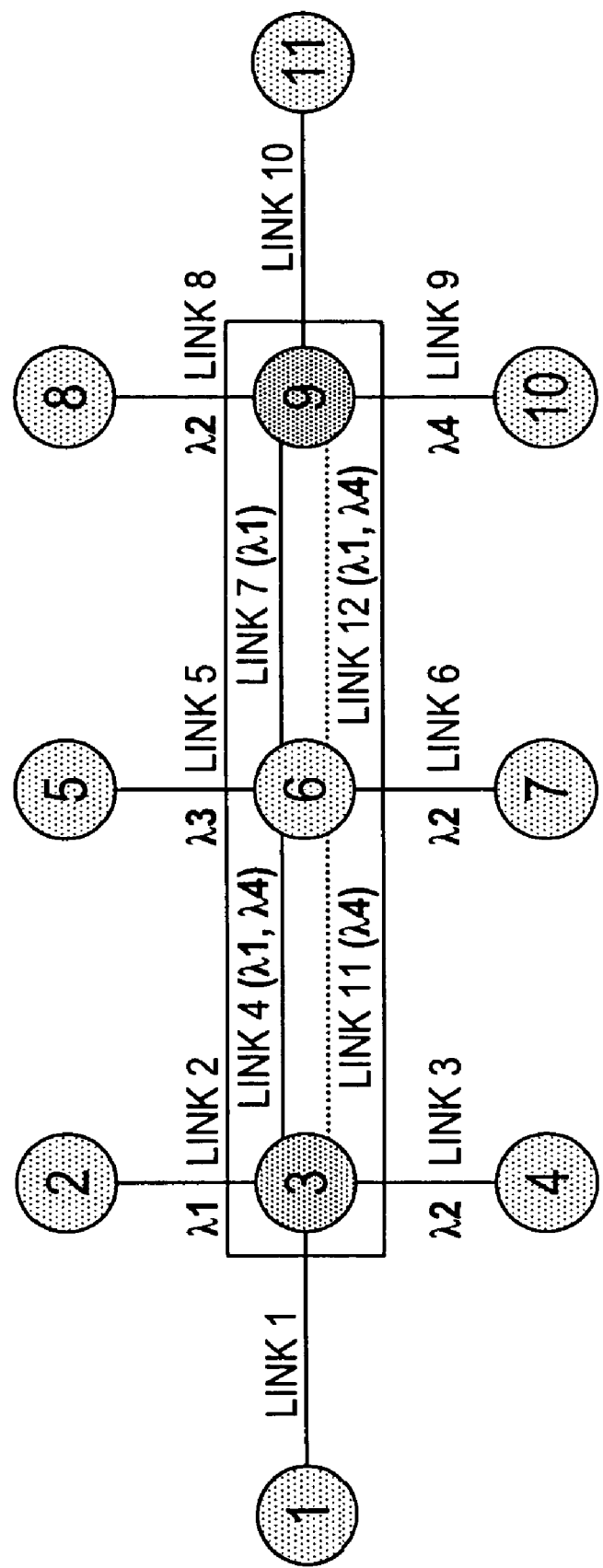
FIG. 9 illustrates how the most fragmented wavelength is selected for an optical path.

FIG. 9 shows how the most fragmented wavelength is selected for an optical path from node N3 to node N9 passing through a regenerator node N6. The wavelengths in bold next to some of the links represent the consumed wavelengths on these links. In this example there are only four wavelengths available on each link of trail N3-N9, namely λ1, λ2, λ3 and λ4. WAM 24 builds a wavelength availability table, Table 2, and a wavelength fragmentation table, Table 3, for the optical path, and calculates a fragmentation index for the optical path. The wavelength with the highest fragmentation index $F_i$ and which is available, is assigned to the respective path. When building the fragmentation table, all wavelengths on all links connected to all nodes in the optical path are considered (e.g., Link1 to Link10 in the example of FIG. 9)

TABLE 2

Wavelength availability table

| Wavelength | Link 4 | Link 7 |
|---|---|---|
|  | λ2 | λ2 |
|  | λ3 | λ3 |
|  | No | λ4 |

Since λ4 is not available along the entire optical path, it is not considered.

TABLE 3

Wavelength fragmentation table

| Wavelength | 3 | 6 | 9 | Fi |
|---|---|---|---|---|
| λ1 | 2 | 2 | 1 | 5 |
| λ2 | 1 | 1 | 1 | 3 |

TABLE 3-continued

Wavelength fragmentation table

| Wavelength | 3 | 6 | 9 | Fi |
|---|---|---|---|---|
| λ3 | 0 | 1 | 0 | 1 |
| λ4 | 1 | 1 | 1 | 3 |

λ1 has the highest fragmentation index ($F_i$=5). However, it can be seen from Table 2 that λ1 is not available along the optical path N3-N9. Therefore, wavelength λ2 with the next highest $F_i$ is considered next. Cross-referring Table 2 with Table 3, it can be seen that λ2 is available along the entire optical path, hence this wavelength is assigned to optical path N3-N9. By assigning λ2 to for the new optical path rather than λ1, fragmentation of wavelengths λ3 is beneficially maintained to $F_i$=1.

If the fiber type on Link 4 and Link 7 is different (e.g. LEAF fiber between nodes N3 and N6 and SMF fiber between nodes N6 and N9), WAM 24 will use the wavelength profile corresponding to the best performing fiber type (LEAF in this example). The length of the fiber type segments is not taken into account.

If there are multiple links between a pair of nodes, such as Link 11 and Link 12 shown in FIG. 9 in dotted lines, WAM 24 will initially perform a logical OR on the wavelengths available on the respective parallel links. Once the least fragmented continuous wavelength along the optical path has been determined, the actual link to be used in the optical path can be determined. If the required wavelength is available on more than one link, an arbitrary decision will be made as to which link to use. For the example in FIG. 9:

Link4: λ2, λ3

Link11: λ1, λ2, λ3

The result from the OR operation between Link 4 and Link 11 is λ1, λ2, λ3. If λ1 turned out to be the best wavelength for the optical path, then the post processing step will select Link 11 for the optical path. If λ2 turned out to be the best wavelength, then either Link4 or Link11 can be used in the optical path.

The foregoing is merely illustrative of a few exemplary embodiments according to the principles of the invention. Those skilled in the art will be able to devise numerous arrangements, which, although not explicitly shown or described herein, nevertheless embody those principles that are within the spirit and scope of the invention. Such modifications are therefore contemplated by the teachings herein. Accordingly, the scope of the invention is only limited by the claims appended hereto.

We claim:

1. In an automatically switched optical network equipped with a data topology system (DTS) for maintaining updated information on regenerator availability and a wavelength database organized in wavelength bins, for maintaining updated data on Q_based performance and wavelength availability, where Q is a quality factor, a method of engineering a connection between a source network node with a destination network node, the method comprising:

a) identifying from said DTS, a number of physical layer trails, N, connecting said source network node to said destination network node;

for an optical trail Tn,
b) identifying from said DTS a number k of regeneration sites and k+1 optical paths, an optical path OP(k) between a regeneration site $R_k$ and a next downstream regeneration site $R_{k+1}$; and
c) for each optical path OP(k), determining whether
a group of qualified wavelength bins associated with each optical path OP(k) contains a wavelength available along the entire path OP(k);
d) for each optical path OP(k) whose associated bin contains a wavelength available along the entire path OP(k), engineering a trail solution based on Q-based performance data of each of said optical paths OP(k) and storing said trail solution in a list.

2. The method according to claim 1, further comprising:
d) engineering a configurable number of trail solutions for said N physical layer trails;
e) ordering said trail solutions in said list according to a trail performance parameter; and
f) attempting to establish said connection over a trail solution in said list, starting with a best trail solution.

3. The method according to claim 1, wherein step b) comprises:
determining the best performing fiber type for said trail and assuming a MaxReach parameter of said best fiber type for all fiber links of said trail;
based on said MaxReach parameter, determining the minimum number $K_{min}$ of regenerators necessary for said trail;
calculating an average distance $L_{ave}=L \times c(K_{min}+1)$, where c is a configurable factor and L a link length; and
identifying said k+1 optical paths based on said $L_{ave}$.

4. The method according to claim 3, further comprising re-placing a regenerator for each optical path OP(k) whose associated bins do not contain a wavelength available along the entire path OP(k).

5. The method according to claim 3, wherein step d) comprises generating, for each optical path of said trail, bin profiles for said qualified bins, until a bin with a profile higher than an initial threshold ΔQiniRegen_thrsh is uncovered.

6. The method according to claim 5, wherein said bin profiles are calculated using an engineering tool that is a variant of the quality factor, Q.

7. The method according to claim 5, wherein said bin profiles are generated in a predetermined order determined based on the wavelengths intrinsic performance.

8. The method according to claim 5, wherein said step d) comprises, for each said OP(k):
generating the bin profile for the reminder of said qualifying bins; and
eliminating from said group of qualified bins the bins with a profile lower than an assignment threshold ΔQassign_thrsh and ordering the reminder of said qualified bins according to the difference between the bin profile and the assignment threshold.

9. The method according to claim 8, wherein said step d) further comprises identifying an eligible wavelength, for an optical path, within said qualified bins.

10. The method according to claim 9, wherein said step of identifying an eligible wavelength comprises:
selecting a most fragmented wavelength from a qualified bin with a profile closest to said assignment threshold;
calculating the performance of said most fragmented wavelength taking into account the actual parameters of said optical path;
completing said optical path by storing said regeneration sites and said most fragmented wavelength as said eligible wavelength, if the performance of said most fragmented wavelength is above said assignment threshold; and
repeating previous steps for another most fragmented wavelength from a next qualified bin with a profile closest to said assignment threshold until the performance of said most fragmented wavelength is above said assignment threshold.

11. The method according to claim 10, further comprising re-placing a regenerator of said optical path if no eligible wavelength is available in all of said path's qualified bins.

12. The method according to claim 8, further comprising:
incrementing said initial threshold and said assignment threshold with a predetermined increment; and
generating a further trail solution by repeating step c).

13. A method of placing regenerators along an optical trail in an automatically switched optical network, the method comprising:
organizing all wavelengths available in said optical network into wavelength bins, and assigning to each bin a profile calculated for a specified wavelength in said bin;
placing K regenerators along said trail for identifying k+1 optical paths; and
identifying for each said optical path OP(k) a group of qualified wavelengths bins, where each qualified bin contains a wavelength available along the entire path OP(k).

14. The method according to claim 13, wherein said step of placing K regenerators comprises:
determining the best performing fiber type for said optical trail and assuming a MaxReach parameter of said best fiber type for all fiber links of said trail; and
based on said MaxReach parameter and on the total length of said trail, determining an average distance $L_{ave}$ between two successive regenerators.

15. The method according to claim 13, wherein said step of identifying comprises:
generating, for each optical path of said trail, bin profiles for said qualified bins, until a bin with a profile higher than an initial threshold ΔQiniRegen_thrsh is uncovered.

16. The method according to claim 15, wherein said bin profiles are generated in a predetermined order determined based on the wavelengths intrinsic performance.

17. The method according to claim 15, further comprising for each said OP(k):
generating the bin profile for the reminder of said qualifying bins; and
eliminating from said group of qualified bins the bins with a profile lower than an assignment threshold ΔQassign_thrsh and ordering the reminder of said qualified bins according to the difference between the bin profile and the assignment threshold.

18. The method according to claim 17, further comprising identifying an eligible wavelength for said optical path within said qualified bins.

* * * * *

UNITED STATES PATENT AND TRADEMARK OFFICE
CERTIFICATE OF CORRECTION

PATENT NO. : 7,599,621 B2  Page 1 of 1
APPLICATION NO. : 10/952325
DATED : October 6, 2009
INVENTOR(S) : Guy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1170 days.

Signed and Sealed this

Twenty-eighth Day of September, 2010

David J. Kappos
*Director of the United States Patent and Trademark Office*